United States Patent
Ho et al.

(10) Patent No.: US 7,255,122 B2
(45) Date of Patent: Aug. 14, 2007

(54) ENHANCED EXHAUST FLOW CONTROL FEATURE

(75) Inventors: Thanh Ho, Brunswick, OH (US); Robert J. Herbst, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 11/247,370

(22) Filed: Oct. 11, 2005

(65) Prior Publication Data

US 2006/0096636 A1    May 11, 2006

Related U.S. Application Data

(62) Division of application No. 10/379,956, filed on Mar. 5, 2003, now abandoned.

(60) Provisional application No. 60/431,305, filed on Dec. 6, 2002.

(51) Int. Cl.
    *F15B 13/04* (2006.01)
(52) U.S. Cl. .................. 137/102; 137/625.25; 303/69; 303/127
(58) Field of Classification Search ................ 137/102, 137/596.18, 596.2, 625.25, 625.66; 251/118, 251/120; 138/40; 303/69, 118.1, 127
    See application file for complete search history.

(56) References Cited

U.S. PATENT DOCUMENTS

| 4,134,417 A | 1/1979 | Horowitz |
| 4,577,910 A | 3/1986 | Worbois |
| 4,858,638 A | 8/1989 | Cseri |
| 5,078,455 A | 1/1992 | Washington |
| 5,118,169 A | 6/1992 | Moller |
| 5,425,572 A | 6/1995 | Koelzer et al. |
| 5,918,852 A * | 7/1999 | Otto .................. 251/30.04 |
| 6,206,487 B1 * | 3/2001 | Nakamura et al. ....... 303/118.1 |
| 6,267,135 B1 * | 7/2001 | Ho .................. 137/102 |
| 6,386,649 B1 | 5/2002 | Ross |

FOREIGN PATENT DOCUMENTS

| DE | 33 40 525 A1 | 11/1983 |
| DE | 39 38 101 | 5/1991 |
| DE | 197 44 389 | 4/1999 |

OTHER PUBLICATIONS

Bendix Commercial Vehicle Systems LLC, Bendix M-30 AntiLock Modulator Assembly, SD-13-4830, first published Jan. 2000, pp. 1-8, Elyria Ohio USA.

* cited by examiner

*Primary Examiner*—Ramesh Krishnamurthy
(74) *Attorney, Agent, or Firm*—Eugene E. Clair

(57) ABSTRACT

A valve for use in a pneumatic fluid system, such as an air brake system, is disclosed. The valve provides for fast release of pneumatic fluid from the delivery cavity through the exhaust port upon cessation of flow from the pneumatic fluid reservoir through the supply cavity. The valve includes a flow diverter that restricts fluid flow from the delivery cavity to the supply cavity when pneumatic fluid pressure in the supply cavity is less than that in the delivery cavity with minimal restriction of flow from the supply cavity to the delivery cavity when pressure in the supply cavity is greater than in the delivery cavity.

5 Claims, 3 Drawing Sheets

US 7,255,122 B2

ENHANCED EXHAUST FLOW CONTROL FEATURE

CROSS REFERENCE TO RELATED APPLICATIONS

This application is a divisional of the pending U.S. patent application Ser. No. 10/379,956 filed Mar. 5, 2003 now abandoned, which claims priority from Provisional Application 60/431,305, filed Dec. 6, 2002, entitled "Enhanced Exhaust Flow Control Feature," the entire disclosures of which are hereby incorporated as if fully rewritten herein.

STATEMENT REGARDING FEDERALLY SPONSORED RESEARCH & DEVELOPMENT

This invention was not made by an agency of the United States Government nor under contract with an agency of the United States Government.

BACKGROUND OF THE INVENTION

The present invention relates to a valve for quick release of pneumatic pressure in a pneumatic fluid system. It finds particular application with air brakes used in conjunction with heavy or commercial vehicles and will be described with particular reference thereto. The invention may be used in other applications without departing from the spirit and scope of the invention.

Some air brake valves used in the industry today (e.g., in Europe) do not meet release timing requirements of Federal Motor Vehicle Safety Standard (FMVSS) 121, Air Brake Systems. The release timing requirements relate to how quickly the brakes release after the brake pedal is allowed to return to its normal position. In order to use these valves Brake Systems. The release timing requirements relate to how quickly the brakes release after the brake pedal is allowed to return to its normal position. In order to use these valves in the worldwide market, the release timing must be improved to meet the requirements of this market. As shown in FIG. 1, current brake system valves utilize a fixed inlet orifice 1 to generate a pressure differential across an exhaust diaphragm 2 to enhance the release timing.

When the actuator 3 for the brake valve is released (e.g., foot lifted from a brake pedal), the air flows from the brake chamber 4 to the actuator 3 through a fixed inlet orifice 1. While the fixed inlet orifice does provide some pressure differential across the exhaust diaphragm, relatively little air, less than 50%, actually is exhausted through the exhaust port, and only slight improvements are realized for the release timing. Moreover, this method restricts the inlet capacity of the valve. Furthermore, this method does not sufficiently improve the release timing to meet the FMVSS 121 requirements.

Patent disclosure DE3938101A1 discusses reducing the vent time of a pressure control valve for improved release timing. In this disclosure a "reflux" valve is placed directly in the inlet flow path, thus restricting the inlet flow. Inclusion of a reflux valve that restricts inlet flow doesn't, however, provide both apply and release timing sufficient to meet, for example the requirements of FMVSS 121. Apply timing relates to how quickly the brakes are applied after pressing the brake pedal. The enhancement for the release timing in disclosure DE3938101A1 degrades the performance of the valve for the apply timing. With the current sizing requirements of the antilock brake system (ABS) valve, it is not capable to meet both apply and release timing of FMVSS 121 using the "reflux" valve design.

The present invention provides a new and improved apparatus and method which addresses the above-referenced problems.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

In order to provide decreased release timing, such as to meet the FMVSS 121 release timing requirements, the delivery air of the air brake system valve is diverted to the exhaust port in order to limit the amount of air returning through the inlet port of the valve. In this manner, the release timing is improved without significantly increasing the apply timing. The feature described below meets the required release timing of FMVSS 121 without significantly restricting the inlet capacity of the valve (see FIGS. 2 and 3) such that the required apply timing of FMVSS 121 is met. The invention is not limited to features requiring compliance with FMVSS 121 release and apply timing requirements, but is discussed below in relation to features that will meet these requirements.

As used herein, "apply timing" means the time from the first movement of the brake valve actuator (brake pedal) for the brake chamber to reach 60 psi with an initial service reservoir pressure of 100 psi. As used herein, "release timing" means the time from initial brake pedal movement (release) for a set of brake chambers initially at 95 psi to reach psi. Unless otherwise specified, use of the term "or" herein is the inclusive, and not the exclusive, use. See BRYAN A. GARNER, A DICTIONARY OF MODERN LEGAL USAGE 624 (2d Ed. 1995).

Figure 1:
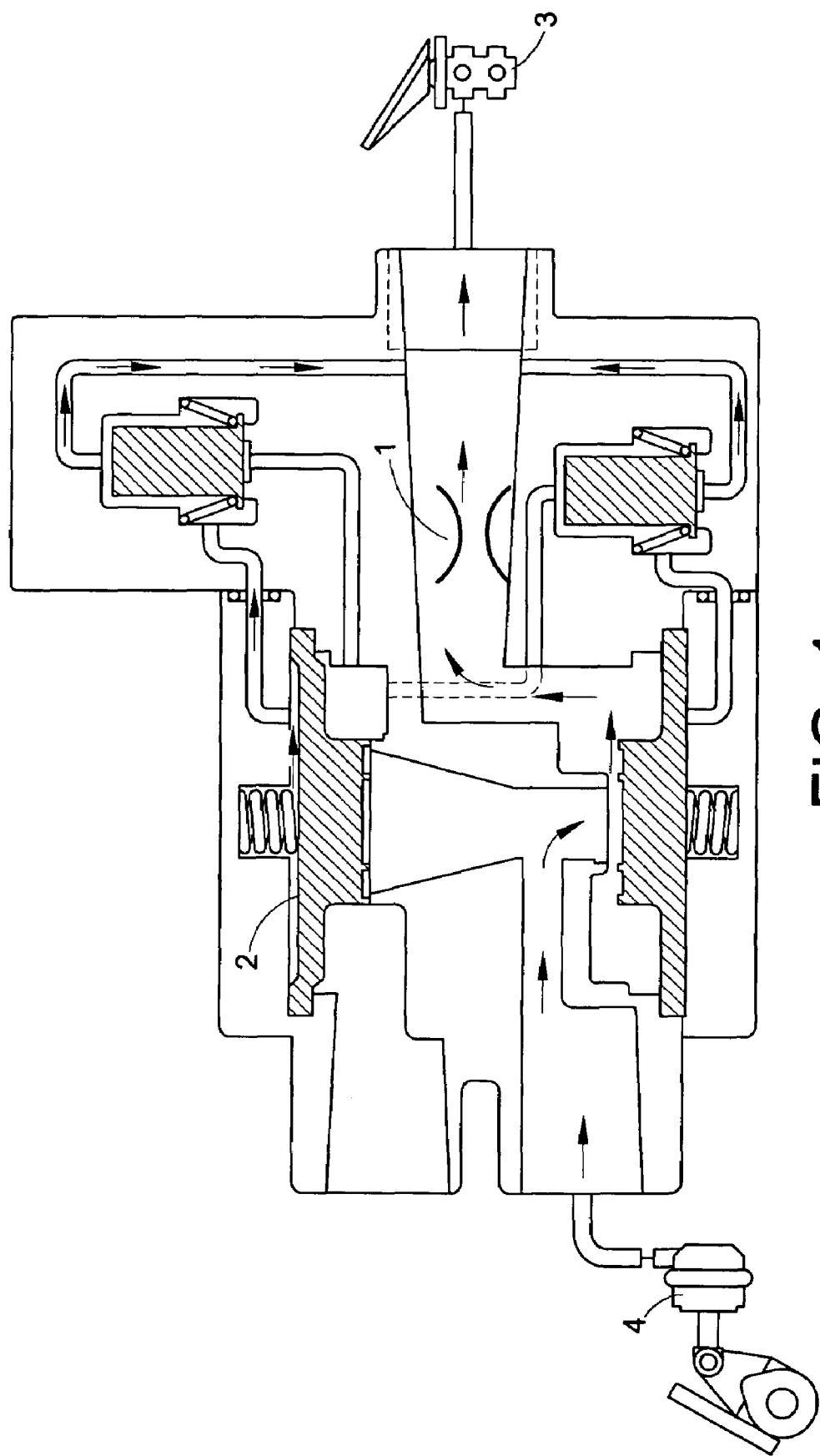
FIG. 1 illustrates a prior art valve.

The release timing of a brake valve correlates to how quickly the pressure of the pneumatic fluid therein, often air, is released from the brake chamber 4 (see FIG. 1). The more quickly the pneumatic fluid pressure applied to the brake chamber 4 is released, the more quickly the brake will release. The present invention provides for a restriction in the fluid flow from the brake chamber 4 to more quickly begin fluid communication with an exhaust port and to redirect more of the fluid to the exhaust port after the actuator 3 is released. This creates a pressure differential across the exhaust diaphragm 2 to unseat the exhaust diaphragm 2 and exhaust fluid. The greater the pressure differential, the more quickly the exhaust diaphragm 2 is unseated and the greater is the quantity and speed of the fluid exhausted. Unlike conventional valves that have some restriction, however, the present invention provides a restriction that does not significantly reduce the incoming fluid flow upon application of the actuator 3 to engage the brake. Therefore, there is minimal reduction of the apply timing due to the restriction.

Generally, the restriction device, herein called a flow diverter, has at least two positions—a first or open position when the pneumatic fluid flows to actuate the brake and a second or closed position when the brake is released. When in the first position, the flow diverter does not significantly restrict fluid flow to actuate the brake. When in the second position, the flow diverter diverts fluid flow to the exhaust by restricting the flow back in the direction of the actuator 3. The flow diverter may divert all or a portion of the fluid to the exhaust. Thus, the flow diverter does not significantly reduce the apply timing, as does a conventional fixed inlet orifice 1.

Figure 2:
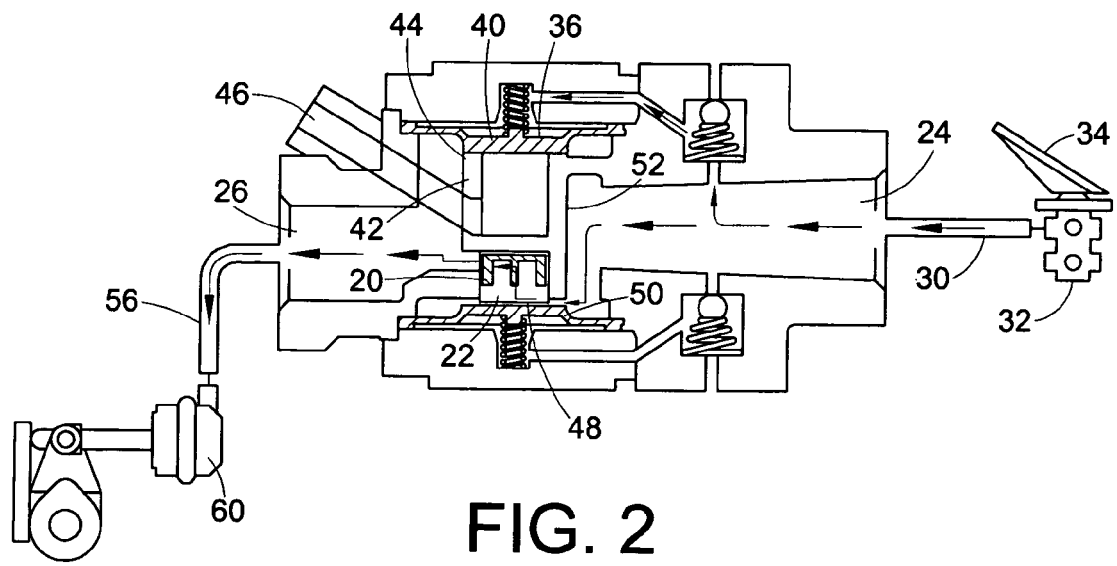
FIG. 2 illustrates a flow diverter as positioned during a brake application in accordance with one embodiment of the present invention.
Figure 3:
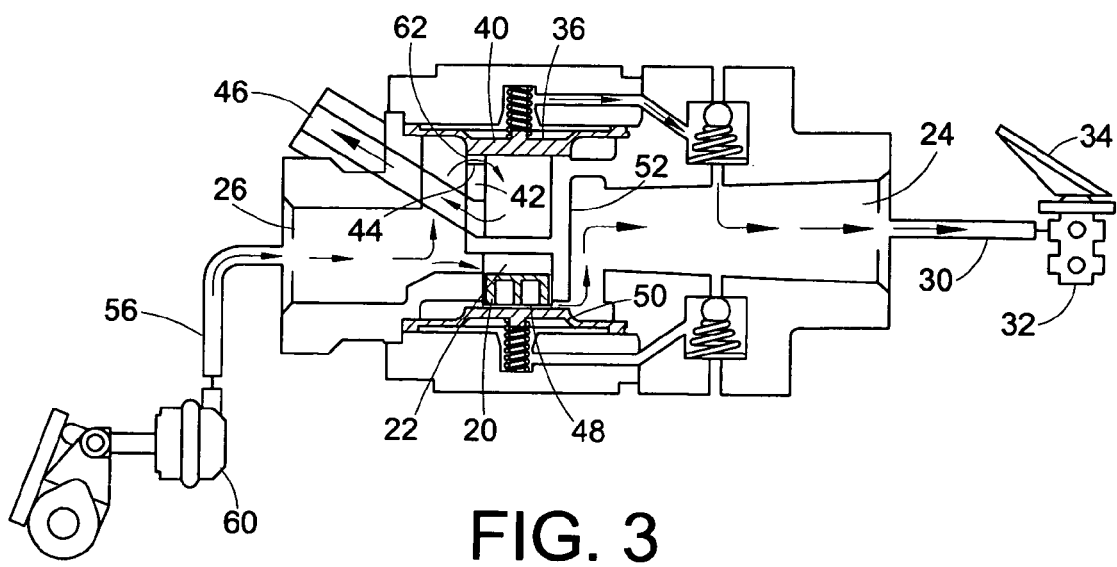
FIG. 3 illustrates a flow diverter as positioned during a brake release in accordance with one embodiment of the present invention.

FIG. 2 illustrates a flow diverter 20 as positioned during a brake application, in accordance with one embodiment of the present invention. FIG. 3 illustrates the flow diverter 20 as positioned during a brake release operation, in accordance with the embodiment illustrated in FIG. 2. Air flow paths of the delivery air during brake application and release are shown by arrows in FIGS. 2 and 3, respectively. Flow diverter 20 moves freely within a bore 22 according to relative air pressures in a supply (inlet) cavity 24 and a delivery cavity 26.

As shown in FIG. 2, air from a service reservoir (not shown) enters the supply (inlet) cavity 24 via an inlet/outlet port 30 when a brake valve 32 is actuated via, for example, a foot pedal 34. The air creates pressure in the supply cavity 24 and passes to a control side 36 of an exhaust diaphragm 40. The pressure created by the air at the control side 36 creates a stronger force on the exhaust diaphragm 40 than the pressure on the other side of the exhaust diaphragm 40 and urges the exhaust diaphragm 40 to seat against a housing wall 42 at a point 44. Typically, the exhaust diaphragm 40 will be biased to seat against the housing wall 42 at point 44. A portion of the other side of the exhaust diaphragm 40 is exposed to the pressure of delivery cavity 26 and a portion is exposed to the pressure of an exhaust port 46. The pressure of the exhaust port 46 is generally atmospheric pressure. As will be discussed in more detail below, the seating of the exhaust diaphragm 40 at the point 44 creates a seal between the delivery cavity 26 and the exhaust port 46. At the same time, the air creating pressure in the supply cavity 24 also passes through a passage 48 between a supply (hold) diaphragm 50 and a housing wall 52.

After passing through the passage 48, the air passes into the bore 22. A flow diverter 20, which is described in more detail below, is positioned within the bore 22. The air exits the bore 22 via a passage (not shown) into the delivery cavity 26. Because of the seal created between the delivery cavity 26 and the wall 42 at point 44, the air entering the delivery cavity 26 from the bore 22 does not pass to the exhaust port 46; instead, the air passes from the delivery cavity 26 to a delivery port 56 and then to a brake chamber 60.

Figure 4:
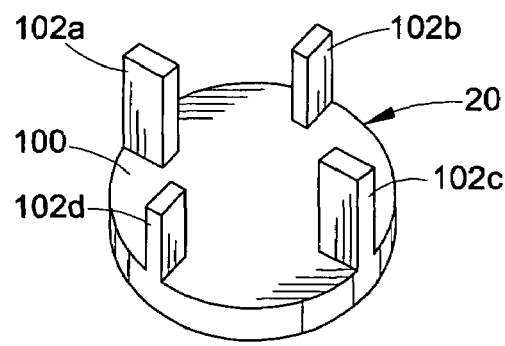
FIG. 4 illustrates a perspective view of the flow diverter in accordance with one embodiment of the present invention.

As shown in FIGS. 2 and 4, the flow diverter 20 includes a restrictor portion 100 and a spacer portion 102. In the illustrated embodiment, the restrictor portion 100 is flat; furthermore, the spacer portion includes a plurality (e.g., four) of legs 102*a*, 102*b*, 102*c*, 102*d*. Additionally, an outer diameter of the restrictor portion 100 is sized to be smaller than an inner diameter of the bore 22. In one embodiment, the outer diameter of the restrictor portion 100 is about 0.475 inches while the inner diameter of the bore 22 is about 0.490 inches. The flow diverter 20 illustrated in FIGS. 2 and 4 represents only one embodiment and other embodiments including other designs, shapes, and/or dimensions of the flow diverter 20 relative to the bore 22 are contemplated.

For example, the surface of restrictor portion 100 may be of any shape suitable for use, including regular or irregular polygons, such as rectangular, pentagonal, hexagonal, octagonal, or dodecahedral polygons. Preferably, the restrictor portion 100 is circular, if the cross-section of the bore 22 is circular. The diameter of the restrictor portion 100 is dimensioned relative to the diameter of the bore 22 such that the restrictor portion 100 provides sufficient resistance to the flow of air to divert a sufficient amount, preferably at least about 50%, of the air in the delivery cavity 26 to the exhaust port 46. The flow diverter 20 also is dimensioned so that there is minimal restriction in the flow of air from supply cavity 24 to delivery cavity 26. The restriction is such that the desired apply timing may still be obtained. Preferably, the flow diverter 20 provides a restriction in the flow in this direction of no more than about 25%. Therefore, one of skill in the art may determine the optimum diameter of the restrictor portion 100 without undue experimentation.

Moreover, while the spacer portion 102 is illustrated with four legs 102*a*, 102*b*, 102*c*, 102*d*, there may be any number of legs, including three legs, so long as there is sufficient stability to enable the flow diverter 20 to divert the requisite air to the exhaust port 46 without significantly restricting the flow of air from the supply cavity 24 to the delivery cavity 26 when the brake valve 32 is actuated. The number of legs may be chosen without departing from the spirit and scope of the invention.

The shape of the legs 102*a*, 102*b*, 102*c*, 102*d* is illustrated as rectangular prisms, but any suitable shape is contemplated, such as any suitable regular or irregular polygon, and is within the spirit and scope of the invention. The shape of the legs 102*a*, 102*b*, 102*c*, 102*d* is to be selected such that there is minimal interference with air flow between the supply cavity 24 and the delivery cavity 26, while providing sufficient support for the restrictor portion 100. For example, the shape of the legs 102*a*, 102*b*, 102*c*, 102*d* may be selected to have tapering or curved portions to reduce the turbulent flow characteristics of the air and to reduce stress points on the flow diverter 20. In one design, the legs 102*a*, 102*b*, 102*c*, 102*d* have a triangular cross section. There may also be ribs between the legs or otherwise provided, for example, to provide additional strength for the legs.

The specific dimensions of the restrictor portion 100 and the spacer portion 102 may be selected based on the circumstances and parameters of each particular application without departing from the spirit and scope of the invention. Suitable dimensions may be determined without undue experimentation based on the measurement of the release timing and apply timing of the brake.

Also, the flow diverter 20 may be a spherical ball or a cylindrical slug or other shape dimensioned such that, for example, the pressure of the air in the supply cavity 24 is sufficient to move the ball or slug substantially out of the way of the flow of air from the supply cavity 24 to the delivery cavity 26, but the ball or slug interposes restriction in the flow of air from the delivery cavity 26 to the supply cavity 24. Thus, the flow diverter 20 need not have both a restrictor portion 100 and a spacer portion 102, but may be provided as one portion.

Although the flow diverter 20 has been discussed thus far as restricting flow of air from the supply cavity 24 to the delivery cavity 26, but allowing some flow of air in this direction, the flow diverter 20 may also completely restrict any flow of air from the supply cavity 24 to the delivery cavity 26. There need not be any leak by or flow of air back into the supply cavity 24 around or through the flow diverter 20. For example, a flapper or check valve may be placed in or near the passage 48 that is in an open position when air is flowing from the supply cavity 24 to the delivery cavity 26, but is in a closed position when air is no longer flowing in that direction.

The material from which the flow diverter 20 is made may be any conventional material selected, for example, based on cost, availability, weight, or any other parameter without departing from the spirit and scope of the invention. Preferably, the material is plastic, but metals, such as aluminum, are also suitable. The specific material chosen may affect the restriction of fluid flow because of, for example, weight or surface smoothness, but the appropriate shape and dimensions for the chosen material may be determined without undue experimentation.

As illustrated in FIG. 2, the flow diverter 20 is positioned in the bore 22 upon a brake application such that the flow diverter 20 does not substantially interfere with the flow of air from the supply cavity 24 to the delivery cavity 26 via the bore 22. For example, the restrictor portion 100 is above the passage (not shown) from the bore 22 to the delivery cavity 26. The legs 102a, 102b, 102c, 102d are designed such that they do not substantially interfere with the flow of air from the bore 22 to the delivery cavity 26 upon brake application.

As shown in FIG. 3, when the brake valve 32 is no longer actuated (e.g., when the brake valve or foot pedal is released), air begins to flow from the control side 36 of the exhaust diaphragm 40 into the supply cavity 24. Air in the supply cavity 24 is exhausted via the inlet/outlet port 30, thereby causing a pressure drop in the supply cavity 24. Once the pressure in the supply cavity 24 drops, air begins to flow from the delivery cavity 26 to the supply cavity 24 via the bore 22. The flow diverter 20 is then positioned as shown in FIG. 3. The restrictor portion 100 reduces the amount of air that flows from the delivery cavity 26 to the supply cavity 24 via the bore 22 and passage 48.

Because a restricted amount of air is permitted to escape from the delivery cavity 26 via the bore 22 and, furthermore, because of the reduced pressure at the control side 36 of the exhaust diaphragm 40, the pressure of air in the delivery cavity 26 urges the exhaust diaphragm 40 to become unseated from the wall 42 at the point 44. Consequently, air passes from the delivery cavity 26 to the exhaust port 46 via a channel 62 defined between the exhaust diaphragm 40 and wall 42. More specifically, the higher pressure in the delivery cavity 26 unseats the exhaust diaphragm 40, directing the major portion of the delivery air flow out the exhaust port 46. The combination of low pressure on the control side 36 of the exhaust diaphragm 40 and high pressure on the seat side speeds the opening of the exhaust valve and the release timing of the valve.

As shown in FIGS. 2 and 3, the flow diverter 20 allows minimally-restricted inlet flow during brake application and meters back flow during brake release. The metering of back flow quickly induces a differential pressure across the exhaust diaphragm triggering the opening of the exhaust seat. This unseating results in the improved release timing that meets the FMVSS 121 timing requirements.

The flow diverter 20 is a flow-activated device having two positions of operation. During a brake application the flow diverter is moved by the application air to its minimally restricted open position. This allows the ABS valve to meet the FMVSS 121 apply timing requirement. During the brake application release, the flow of delivered air carries the flow diverter 20 to its metering position (see FIG. 3). At this position the flow diverter 20 diverts the majority of the air in the delivery cavity to the exhaust port 46 and restricts the amount of air returning to the inlet/outlet 30 of the valve 32 through the clearance between its outside diameter and the housing bore's inside diameter.

Figure 5:
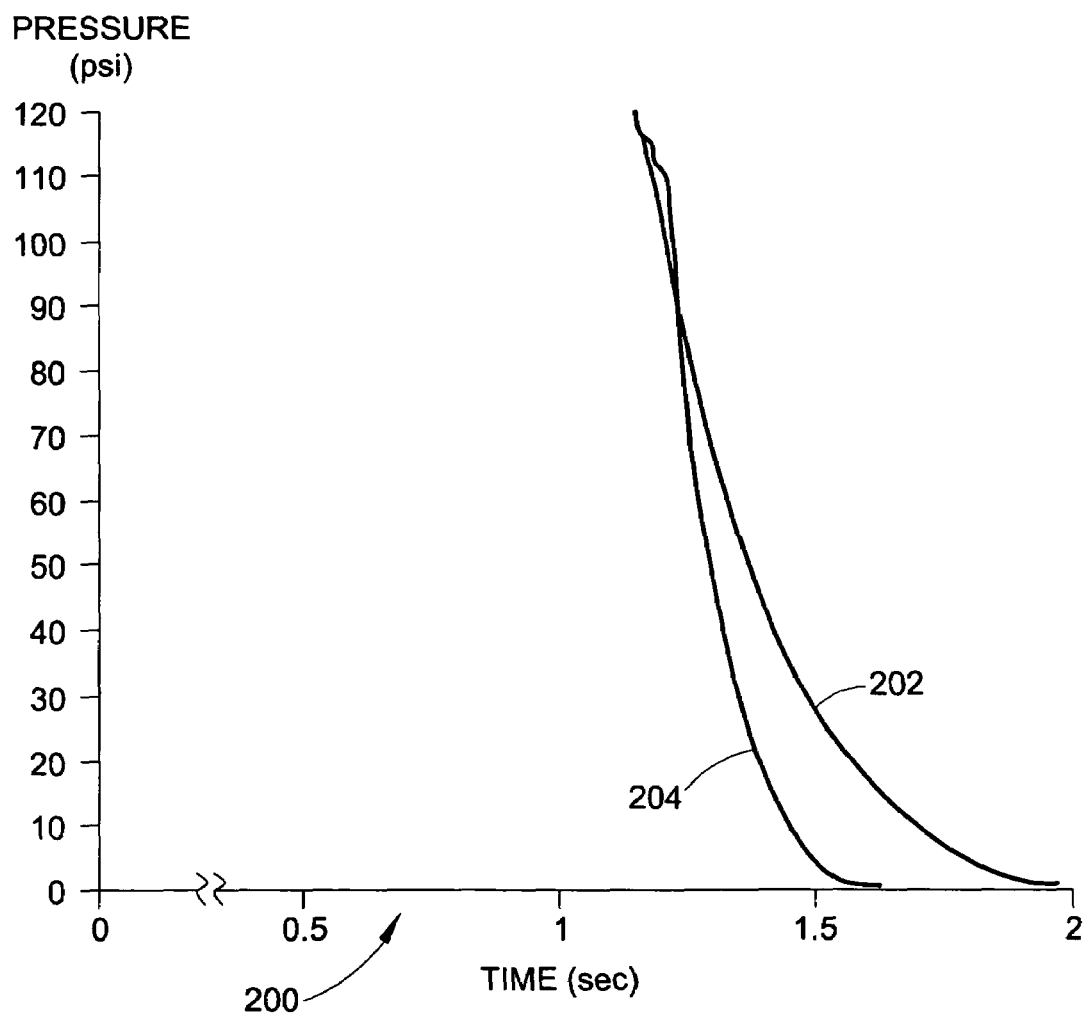
FIG. 5 illustrates a graph showing test data.

A valve available from Knorr Bremse with a part number of BR9164 was fitted with a flow restrictor 20 having three legs with substantially triangular cross sections. In this embodiment, the inner diameter of the bore 22 was about 0.490 inches and the outer diameter of the restrictor portion 100 was about 0.481 inches. FIG. 5 illustrates a graph 200 of test data showing a reduction in the amount of time for releasing pressure in the delivery cavity 26 (see FIGS. 2 and 3) from 95 psi to 5 psi. A line 202 shows that, for these dimensions, it took about 0.564 seconds to release the pressure without the flow diverter according to the present invention. Furthermore, a line 204 shows that, for the same embodiment, it took about 0.267 seconds to release the pressure with the flow diverter according to the present invention. The reduction in flow area for the air passing from the supply cavity 24 to the delivery cavity 26 imposed by the flow diverter 20 for three different tests was about 23.3%, about 23.8%, and about 23.9%, with an average of about 23.7%, or less than 25%.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept.

We claim:

1. A method of controlling air flow in an air brake valve having a supply cavity, an exhaust port and a delivery cavity, comprising:
    communicating a majority of the air from the supply cavity to the delivery cavity approximately across a generally central axis of a flow diverter when the pressure of the air in the supply cavity is greater than the pressure of the air in the delivery cavity;
    diverting communication of the air when the pressure of the air in the delivery cavity is greater than the pressure of the air in the supply cavity so that a majority of the air from the delivery cavity flows to the exhaust port and the remaining air returns to the supply cavity traversing the flow diverter in its seated position.

2. A method of controlling air flow as in claim 1, wherein the air flowing from the supply cavity to the delivery cavity flows through an at least two legs portion of the flow diverter when the flow diverter is disposed in a first position.

3. A method of controlling air flow as in claim 1, wherein the air passing from the delivery cavity to the supply cavity flows across a restrictor portion of the flow diverter when the flow diverter is disposed in a second position.

4. An air brake valve having a supply cavity, an exhaust port and a delivery cavity comprising:
    a generally cylindrical bore between the supply cavity and the delivery cavity,
    a flow diverter with an at least two legs portion wherein the flow diverter is placed in the bore such that the flow diverter freely moves to a first position when the pressure of the air in the supply cavity is greater than the pressure of the air in the delivery cavity, thereby restricting a minority of the air flow from the supply cavity to the delivery cavity through the at least two legs portion, and wherein the flow diverter with a restrictor portion freely moves to a second seated position when the pressure of the air in the delivery cavity is greater than the pressure of the air in the supply cavity, thereby diverting a majority of air from the delivery cavity to an exhaust port and allowing a minority of air to pass from the delivery cavity to the supply cavity traversing the restrictor portion.

5. An air brake valve as in claim 4 wherein the flow diverter comprises:

a first surface and a second surface;

wherein the at least two legs are disposed on the first surface such that the air flow from the supply cavity to the delivery cavity is communicated generally across the first surface through the at least two legs.

* * * * *

UNITED STATES PATENT AND TRADEMARK OFFICE
CERTIFICATE OF CORRECTION

PATENT NO. : 7,255,122 B2  
APPLICATION NO. : 11/247370  
DATED : August 14, 2007  
INVENTOR(S) : Thanh Ho et al.

It is certified that error appears in the above-identified patent and that said Letters Patent is hereby corrected as shown below:

Column 7, line 1: Please insert the word -- seated -- after the word "first".

Signed and Sealed this

Twentieth Day of November, 2007

JON W. DUDAS  
*Director of the United States Patent and Trademark Office*